Patented June 6, 1939

UNITED STATES PATENT OFFICE 2,161,039

MANUFACTURE OF POLYMERIZATION PRODUCTS

Bernard James Habgood, Rowland Hill, and Leslie Budworth Morgan, Blackley, England, assignors to Imperial Chemical Industries Limited, a corporation of Great Britain No Drawing. Application July 16, 1937, Serial No. 154,098. In Great Britain July 20, 1936.

12 Claims. (Cl. 260—84)

According to this invention we make new synthetic materials, possessing valuable rubber-like properties, by the process which comprises interpolymerizing in aqueous emulsion a mixture of butadiene and a chloromethacrylic ester of the formula

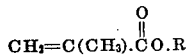

wherein R stands for an alkyl radical which contains not more than 3 carbon atoms, and in which a single hydrogen atom is replaced by chlorine.

The alkyl radical may be chloromethyl, $\alpha$-, $\beta$-chloroethyl or $\alpha$-, $\beta$- or $\gamma$-chloropropyl or $\alpha$- or $\beta$-chloroisopropyl.

The chloroalkyl methacrylic esters may be made by interacting the appropriate alcohols with methacrylic acid or its chloride.

The aqueous emulsion for polymerization may be obtained, for example, by passing the requisite quantity of butadiene gas or cooled butadiene into a mixture of water or ice, the ester, and other necessary ingredients in a closed vessel and agitating. The emulsification and interpolymerization can be conveniently effected in what may be regarded as a single technical operation, if the ingredients of the mixture are emulsified by agitating at the temperature at which interpolymerization is to be effected, and agitation then continued sufficiently long for the necessary interpolymerization process to take place. Suitable emulsifying agents are salts of bases of high molecular weight and organic or inorganic acids, such as diethylaminoethyloleylamide acetate or hydrochloride, cetyltrimethylammonium methyl sulphate, dimethylcetylsulphonium methyl sulphate and cetylpiperidinium methosulphate.

Small proportions of one or more suitable electrolytes, e. g., acetic acid or acetic acid admixed with sodium acetate, may conveniently be included in the mixture. Small proportions of chlorinated hydrocarbons, e. g., carbon tetrachloride, may be also included. The aforementioned substances have the general effect of either increasing the total yield of rubber-like product, or increasing the rate of formation, or both, and they may in addition, improve the physical properties of the products.

The interpolymerization products are produced in latex-like form. They may be obtained in massive form by coagulating the latex, separating the coagulum, washing and drying. The coagulation may be effected by adding ethyl alcohol to the latex or by using one of the other processes already known for this purpose. Washing and drying may be effected on heated rollers, provided with a water spray device.

The interpolymerization products when sheeted out have a general resemblance to natural crepe rubber. They can be compounded and vulcanized or cured, and according to the compounding and vulcanizing conditions, especially the latter, different kinds of vulcanized products are obtained. When compounded as for a natural rubber stock with about 1–3% sulphur, and given an ordinary cure, an unexpected result is obtained, in that vulcanizates are obtained, having the properties of the ebonite or semi-ebonite obtainable from natural rubber. When compounded as for a natural rubber stock, but with no sulphur, or very little sulphur, or as for a polymerized 2-chloro-1:3-butadiene stock, e. g., with magnesia, zinc oxide and wood rosin, and given an ordinary cure, vulcanizates resembling ordinary vulcanizates from natural rubber are obtained. The vulcanizates obtained without sulphur or with very little sulphur, have good tensile strength and extensibility. The vulcanizates obtained with about 2% of sulphur have good resistance to oils and solvents, good hardness, and good general mechanical properties. By suitably varying the proportion of sulphur, and, as necessary, the other ingredients of the mix, a graded series of vulcanizates can be obtained having properties from those of soft rubber vulcanizates to those of rubber ebonites. As will be seen, these new synthetic rubber-like materials because of the flexibility, which they allow in handling, and of the variety of products, which they are capable of yielding, are very well adapted for use in the rubber industry, which comprises such a multiplicity of different manufactures. It will be seen from what has been said that ebonite-like products are obtained from mixes with only about 2% of sulphur and with vulcanization treatments similar to those used for soft rubber vulcanizates. As against this, ebonites are only obtained from natural rubber by the use both of high percentages of sulphur and drastic conditions of vulcanization, which cause difficulty and inconvenience in manufacture, which are avoidable with the synthetic rubber-like materials of this invention. Natural rubber or other synthetic rubber-like materials may be used in conjunction with the interpolymerization products.

The following examples, in which parts are by weight, illustrate but do not limit the invention.

*Example 1.*—30 parts of butadiene, 15 parts of $\beta$-chloroethyl methacrylate (a new compound, B. P. 174–176° C. made by esterifying methacrylic acid by means of ethylene chlorohydrin), 60 parts of a 2% aqueous solution of trimethylcetylammonium sulphate and 3.5 parts of 6% acetic acid are mixed together and the mixture agitated in a closed vessel for 5 days at 60° C. The resulting latex-like product is coagulated by adding ethyl alcohol and the coagulum is separated, washed free from soluble substances on a roller mixer and dried. A rubber-like product is obtained in nearly quantitative yield. The compounding and vulcanization of this product are described in Example 4.

*Example 2.*—100 parts of β-chloroethyl methacrylate, 218 parts of butadiene, 200 parts of water, 200 parts of a 10% aqueous solution of diethylaminoethyloleylamide hydrochloride, 35 parts of 6% acetic acid, and 20 parts of carbon tetrachloride are mixed and emulsification, interpolymerization and isolation effected as in Example 1. A very good yield of rubber-like product is obtained. The compounding and vulcanization of this product are described in Example 5.

*Example 3.*—15 parts of γ-chloropropyl methacrylate (a new compound, B. P. 92° C./18 mm.), 35 parts of butadiene, 60 parts of a 2% aqueous solution of diethylaminoethyloleylamide acetate and 3.5 parts of 6% acetic acid are mixed and emulsification, interpolymerization and isolation effected as in Example 1. A good yield is obtained.

*Example 4.*—A mix of the following composition is made up from the product of Example 1.

| | Parts |
|---|---|
| Product of Example 1 | 100 |
| Carbon black | 50 |
| Stearic acid | 2 |
| Zinc oxide | 10 |
| Mercaptobenzthiazole | 1 |
| Sulphur | 2 |

This is then cured for 45 minutes at 141° C. An ebonite-like product having excellent mechanical and physical properties is obtained which is considerably more resistant to oils and solvents than is a similarly compounded and vulcanized natural rubber.

*Example 5.*—A mix is made up of the same composition as in Example 4, except that the product of Example 2 is used in place of that of Example 1. A similar vulcanizate is obtained, having a Shore hardness of 95°.

Vulcanization can be effected in the absence of sulphur, when a very elastic product is obtained. For example the following mixing:

| | Parts |
|---|---|
| Product of Example 2 | 100 |
| Channel black | 50 |
| Wood rosin | 5 |
| Magnesia | 10 |
| Zinc oxide | 10 | after vulcanizing for 1 hour at 141° C. gives a very "nervy" rubber of good strength and high extensibility. By using small amounts of sulphur with or without accelerators intermediate types of products can be obtained.

We claim:
1. Process for the manufacture of new synthetic rubber-like materials, which comprises interpolymerizing in aqueous emulsion a mixture of butadiene and chloromethacrylic ester of the formula

wherein R stands for an alkyl radical, which contains not more than 3 carbon atoms, and in which a single hydrogen atom is replaced by chlorine.

2. Process as claimed in claim 1, in which acetic acid is added to the mixture.

3. Process as claimed in claim 1 in which the emulsion contains an emulsifying agent which is a salt of an organic base of high molecular weight and an acid.

4. Process as claimed in claim 1 in which a small proportion of carbon tetrachloride is added to the mixture.

5. Process for the manufacture of new synthetic rubber-like materials which comprises interpolymerizing a mixture of about 30 parts of butadiene and about 15 parts of beta chloroethyl methacrylate while dispersed in about 60 parts of a 2% solution of trimethylcetylammonium sulfate, which 60 parts of solution also contains about 3.5 parts of a 6% aqueous solution of acetic acid, said interpolymerization being effected by agitating the dispersion for about 5 days in a closed vessel maintained at about 60° C. and thereafter coagulating, washing and drying the resulting interpolymer.

6. Synthetic rubber-like materials obtained by the process of claim 1.

7. Process which comprises compounding and vulcanizing new synthetic rubber-like materials obtained by the process of claim 1.

8. Process which comprises compounding and vulcanizing new synthetic rubber-like materials obtained by the process of claim 5.

9. Vulcanized compounded synthetic rubber-like materials obtained by compounding and vulcanizing synthetic rubber-like materials obtained by the process of claim 1.

10. Vulcanized compounded synthetic rubber-like materials obtained by compounding and vulcanizing synthetic rubber-like materials obtained by the process of claim 5.

11. Process as claimed in claim 1 in which the emulsion contains as an emulsifying agent diethylaminoethyloleylamide acetate.

12. Process as claimed in claim 1 in which the emulsion contains as an emulsifying agent trimethylcetylammonium methyl sulfate.

BERNARD JAMES HABGOOD.
ROWLAND HILL.
LESLIE BUDWORTH MORGAN.

CERTIFICATE OF CORRECTION.

Patent No. 2,161,039.  June 6, 1939.

BERNARD JAMES HABGOOD, ET AL.

It is hereby certified that error appears in the printed specification of the above numbered patent requiring correction as follows: Page 1, first column, line 44, for the syllable "in-" read increasing; and that the said Letters Patent should be read with this correction therein that the same may conform to the record of the case in the Patent Office.

Signed and sealed this 1st day of August, A. D. 1939.

(Seal)

Henry Van Arsdale,
Acting Commissioner of Patents.